(12) United States Patent
Kim et al.

(10) Patent No.: US 9,706,488 B2
(45) Date of Patent: Jul. 11, 2017

(54) APPARATUS AND METHOD FOR ATTEMPTING CONNECTION TO AN ACCESS POINT

(71) Applicants: Samsung Electronics Co., Ltd., Gyeonggi-do (KR); KOREA UNIVERSITY RESEARCH AND BUSINESS FOUNDATION, Seoul (KR)

(72) Inventors: Hyunsoon Kim, Gyeonggi-do (KR); Hwangnam Kim, Seoul (KR); Kang-Jin Yoon, Seoul (KR); Ok-Seon Lee, Gyeonggi-do (KR); Kangho Kim, Busan (KR); Yong-Seok Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 74 days.

(21) Appl. No.: 14/624,302

(22) Filed: Feb. 17, 2015

(65) Prior Publication Data

US 2015/0237572 A1 Aug. 20, 2015

(30) Foreign Application Priority Data

Feb. 17, 2014 (KR) .................. 10-2014-0017661

(51) Int. Cl.
*H04W 48/20* (2009.01)
*H04W 40/24* (2009.01)
*H04W 84/02* (2009.01)

(52) U.S. Cl.
CPC ......... *H04W 48/20* (2013.01); *H04W 40/244* (2013.01); *H04W 84/02* (2013.01)

(58) Field of Classification Search
CPC .... H04W 48/20; H04W 40/244; H04W 84/02
See application file for complete search history.

(56) References Cited

U.S. PATENT DOCUMENTS

| | | | |
|---|---|---|---|
| 2005/0221837 A1 | 10/2005 | Cha et al. | |
| 2007/0064634 A1* | 3/2007 | Huotari | H04W 48/20 370/310 |
| 2011/0039507 A1* | 2/2011 | Sato | H04L 1/0002 455/226.2 |
| 2011/0286329 A1* | 11/2011 | Koo | H04W 48/12 370/232 |
| 2013/0114448 A1* | 5/2013 | Koo | H04W 24/00 370/252 |
| 2013/0279382 A1* | 10/2013 | Park | H04W 74/085 370/311 |

(Continued)

OTHER PUBLICATIONS

"Part 11: Wireless LAN Medium Access Control (MAC) and Physical Layer (PHY) Specifications," IEE Standard for Information Technology-Telecommunications and Information Exchange Between Systems, Local and Metropolitan Area Networks-Specific Requirements, IEEE STD 802.11, New York, Mar. 2012, 2793 pages.

*Primary Examiner* — Omar Ghowrwal

(57) ABSTRACT

Provided is an apparatus and method for connecting to an Access Point (AP) based on beacon information in a wireless communication system. To this end, a wireless device predicts an interference condition from each of a plurality of APs based on information acquired by a received beacon, selects one of the plurality of APs, taking the predicted interference condition into account, and attempts connection to the selected AP.

20 Claims, 7 Drawing Sheets

(56) References Cited

U.S. PATENT DOCUMENTS

| | | | |
|---|---|---|---|
| 2014/0126388 A1* | 5/2014 | Shin | H04W 48/20 370/252 |
| 2014/0341043 A1* | 11/2014 | Prydekker | H04W 36/08 370/241 |
| 2015/0189538 A1* | 7/2015 | Han | H04W 48/20 370/230 |
| 2015/0358884 A1* | 12/2015 | Nagasaka | H04W 48/18 370/230 |

* cited by examiner

APPARATUS AND METHOD FOR ATTEMPTING CONNECTION TO AN ACCESS POINT

CROSS-REFERENCE TO RELATED APPLICATION AND CLAIM OF PRIORITY

The present application is related to and claims priority under 35 U.S.C. §119(a) to Korean Patent Application Serial number 10-2014-0017661, which was filed on Feb. 17, 2014 in the Korean Intellectual Property Office, the entire disclosure of which is hereby incorporated by reference.

TECHNICAL FIELD

Various embodiments of the present disclosure relate to an apparatus and method for connecting an Access Point (AP) based on beacon information in a mobile communication system.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Wireless Local Area Networks (WLANs) have been used to cover, at low cost, a "shadow area" where a wireless communication service is limited. That is, the WLAN is structured to expand a service area using an Access Point (AP).

In the WLAN, to use a communication service, a wireless device needs to select one AP and to connect to the selected AP. For example, in the WLAN, a wireless device provides a scheme for AP selection and AP connection based on Basic Service Set (BSS) load.

A beacon broadcast by the AP includes an element, a BSS load. The BSS refers to a set of one AP and various wireless devices connected to the AP. The BSS load refers to the amount of traffic managed by the AP and is divided into station count, channel utilization, and available admission capacity information. The station count means the number of wireless devices connected to the corresponding AP. The channel utilization means how many busy time slots exist with respect to the maximum number of time slots, 255. The available admission capacity means a time capacity that be provided by the AP under complete control.

The BSS load is sole load information that is provided by the AP in a neighboring wireless device. The wireless device supports a selection algorithm based on the BSS load information. The selection algorithm selects one of neighboring APs and connects to the selected AP. If the BSS load information is complete in real time, accurate feedbacks to wireless traffic be provided to neighboring wireless devices. Also, the wireless device is connected to a particular AP to predict wireless service quality provided by the AP before directly experiencing the traffic.

In the WLAN, various schemes, in addition to the selection algorithm based on the BSS load information, are provided to optimize the wireless communication quality of wireless devices existing in a particular space. An example of a representative scheme is efficiently distributing a wireless capacity.

With the wide spread of wireless devices such as smart phones, pads, and so forth, the number of Wireless Fidelity (WI-FI) wireless routers (APs) have gradually increased per unit area.

When a clear AP selection criterion is provided to a wireless device, the wireless device is autonomously connected to an AP capable of providing the best quality. Various algorithms, such as the selection algorithm based on the BSS load information, a selection algorithm based on Received Signal Strength (RSS), and the like, have been proposed.

A solution has been proposed in which when an AP is initially installed, a position of the AP is optimized or a signal magnitude (or strength) of the AP is limited to increase spatial reusability. In addition, a heterogeneous network selection algorithm exists for devices having various wireless communication functions, such as smart phones or the like, without limiting the range of wireless networks simply to WLANs.

Wireless media managing and monitoring techniques for efficiently using a wireless capacity have no problem theoretically. Also, in various experiments with simulation, the good performance of those techniques has been demonstrated. However, when the motive for sensing a wireless condition is a connection to a new AP, various problems occur.

First, prior to the connection to the new AP, a wireless device and an AP cannot communicate with each other. Except for transmission and reception of a probe request or response or a beacon to prepare for the connection, any data or control frame cannot be exchanged. Thus, there is no way to secure a value such as a packet error rate prior to the connection. It is desirable to search for a new item having a clear correlation with a wireless quality without depending on data traffic, rather than predicting a wireless quality by directly monitoring wireless traffic. In this regard, the BSS load information has a big advantage of being acquired from a beacon transmitted compulsorily by APs. However, there are not enough wireless routers of high performance, being capable of transmitting the corresponding information through the beacon.

Likewise, installation location optimization and signal strength adjustment for APs are not practical solutions, either. Unlike a cell network installed by a common carrier, an entity which installs a wireless AP varies from large enterprises to minority homes, so even when a particular entity optimizes an installation location, it is not certain that another entity will install a new AP according to the installation location. Moreover, it is not certain that an AP exists in a fixed location at all times because a wireless device switches to an infrastructure node, like a WLAN hotspot service of a smart phone.

For signal strength adjustment, to have a function of adjusting a signal strength adaptively to a surrounding situation, implementation of an AP is complex, increasing a cost. As a result, signal strength adjustment does not appeal to either distributors or consumers. Consequently, for an optimized wireless quality of a wireless device, the wireless device needs to suitably predict a wireless quality condition of neighboring APs, without expecting a function or system change of a neighboring AP, thereby guiding connection to an AP being highly likely to secure the best wireless quality.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for determining an AP to which connection is to be attempted, based on a beacon periodically transmitted by an AP in a wireless communication system.

Moreover, various embodiments of the present disclosure provide an apparatus and method in which a wireless device independently predicts a quality of a wireless channel without expecting a function or system change of neighboring APs.

Furthermore, various embodiments of the present disclosure provide network performance optimized for a wireless device by guiding connection to an AP having the best channel quality (interference, noise) through real-time prediction of a wireless channel condition surrounding a terminal with the use of a single metric having a clear correlation with the wireless channel condition.

Other objects to be provided in the present disclosure are understood by various embodiments described below.

According to various embodiments of the present disclosure, a method is provided for connecting to an Access Point (AP) in a wireless device. The method including predicting an interference condition from each of a plurality of APs based on information acquired by a received beacon, selecting one of the plurality of APs, taking the predicted interference condition into account, and attempting connection to the selected AP.

According to various embodiments of the present disclosure, a wireless device connecting to an AP is provided. The wireless device including a receiver configured to receive a signal from each of a plurality of APs, a predictor configured to predict an interference condition based on information acquired using a beacon received by the receiver, and a selector configured to select one AP to which connection is to be attempted from among the plurality of APs, taking the predicted interference condition into account.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
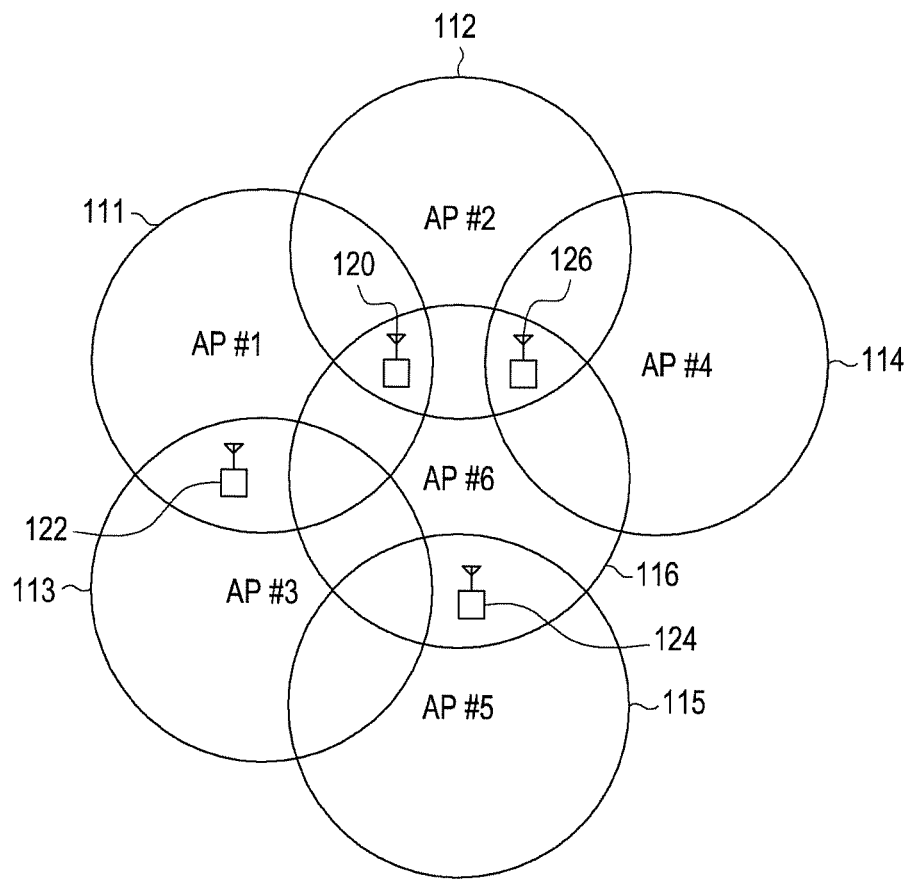
FIG. 1 illustrates an example of a condition of a WLAN where AP selection is required according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Exemplary embodiments of the present disclosure are described herein below with reference to the accompanying drawings. For the purposes of clarity and simplicity, detailed descriptions of well-known functions or configurations can be omitted as they would unnecessarily obscure the subject matters of the present disclosure. Also, the terms used herein are defined according to the functions of the present disclosure. Thus, the terms vary depending on users' or operators' intentions or practices. Therefore, the terms used herein should be understood based on the descriptions made herein.

Although the present disclosure can be modified variously and have several embodiments, specific example embodiments are illustrated in the accompanying drawings and will be mainly described in the specification. However, the scope of the present disclosure is not limited to the specific embodiments and should be construed as including all the changes, equivalents, and substitutions included in the spirit and scope of the present disclosure.

Singular expressions such as "unless explicitly indicated otherwise" or "the" can be understood as including plural expressions. For example, "component surface" can include one or more component surfaces.

Relative terms referred to as illustrated in the drawings, such as a 'front surface', a 'rear surface', a 'top surface', a 'bottom surface', and the like, can be replaced with ordinal numbers such as "first", "second", and so forth. The order of components, such as "first", "second", and so forth, is the order in which they are mentioned or the arbitrarily set order, and thus can be changed arbitrarily. The terms are used for distinguishing one component from another component. For example, a first user device and a second user device are both user devices, and indicate different user devices. Also, a first component can be referred to as a second component and likewise, a second component can also be referred to as a first component, without departing from the teaching of the present disclosure.

Terms used in various embodiments of the present disclosure are intended to describe an exemplary embodiment, rather than to limit the various embodiments of the present disclosure. As used herein, the singular forms are intended to include the plural forms as well, unless the context clearly indicates otherwise. Terms "include" or "may include" used in various embodiments of the present disclosure indicate an existence of disclosed function, operation, or element, but do not limit an existence of one or more other functions, operations, or elements. Terms "include" or "has" used in the present disclosure should be understood that they are intended to indicate an existence of feature, number, step, operation, element, item or any combination thereof, disclosed in the specification, but should not be understood that they are intended to previously exclude an existence of one or more other features, numbers, steps, operations, elements, or any combination thereof or possibility of adding those things.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

The following description of embodiments will be made with reference to the IEEE 802.11 standard. Thus, main techniques of the IEEE 802.11 standard will be described in brief.

First, the IEEE 802.11 standard defines a collision avoidance method. For example, in Carrier Sense Multiple Access/Collision Avoidance (CSMA/CA), 'carrier sense' means sensing a surrounding situation when a wireless device has a signal to be transmitted. When the surrounding situation is suitable for transmission of the signal, the wireless device transmits the signal. However, if the surrounding situation is not proper for transmission of the signal, the wireless device avoids collision by transmitting no signal. This method is called 'CSMA/CA'.

The IEEE 802.11 standard is set to execute Medium Access Control (MAC) as a Distributed Coordination Function (DCF) using the CSMA/CA method.

Collision in a wired environment is generally easy to sense, and thus CSMA/Collision Detection (CD) including collision detection is used. In a wireless environment, however, collision is practically difficult to perfectly sense, so that CSMA/CA including collision avoidance is used. For example, wireless data transmission employing CSMA/CA includes processes described below.

A wireless device checks its buffer. When the wireless device determines that there is data to be transmitted in the buffer, the wireless device determines whether a channel to be used is busy. When determining that the channel is empty, the wireless device waits for a preset back-off time and then starts transmitting the transmission data of the buffer. However, when determining that the channel is not empty, the wireless device waits for the preset back-off time after completion of data transmission by an object using the channel.

The back-off time is divided into several time slots. In certain embodiments, when the channel is empty, the number of time slots corresponding to the back-off time is reduced one by one to reduce the remaining back-off size. When wireless traffic is sensed during a one-by-one reduction of the number of time slots, the wireless device waits until the channel is not used any more, while maintaining the remaining back-off size. The moment when the wireless traffic is stopped, the wireless device resumes reducing the remaining back-off size.

The wireless device starts data transmission as soon as the remaining back-off size becomes 0. The wireless device waits transmission of an ACKnowledgement message (ACK) from a counterpart wireless device after finishing the data transmission. Upon receiving the ACK, the wireless device recognizes that transmission of a corresponding frame is successful. However, when the ACK is not received until the time is out, the wireless device regards collision as occurring during transmission of the frame. In certain embodiments, the wireless device repeats the transmission of the frame, which is likely to increase the back-off time size due to characteristics of a contention window.

Second, the IEEE 802.11 standard defines broadcasting of a beacon. In certain embodiments, a beacon refers to a beacon when a WLAN is in an infrastructure mode.

For example, in beacon transmission, an AP broadcasts frequency information for data transmission or reception, frequency type information, and so forth, as well as identify information such as a Service Set Identifier (SSID), a Basic Service Set Identifier (BSSID), or the like, of the AP, through a beacon frame at predetermined intervals. The predetermined interval for broadcasting the beacon frame is indicated as a beacon interval on an upper portion of the beacon frame. The predetermined interval differs from manufacturer to manufacturer, and is freely set by a user. The predetermined interval is preferably about 100-200 ms. The transmission of the beacon frame is also based on CSMA/CA like general data transmission.

Every wireless device located near the AP that broadcasts the beacon at predetermined intervals collects the beacon being broadcast by the AP through scanning.

FIG. 1 illustrates an example of a condition of a WLAN where AP selection is required according to various embodiments of the present disclosure. In FIG. 1, a WLAN where the service areas 111, 112, 113, 114, 115, and 116 by the six Aps, AP #1 through AP #6, coexist, the wireless devices 120, 122, 124, and 126 are distributed in locations where they receive beacons from at least two APs.

More specifically, the first wireless device 120 is located in an area where the first wireless device 120 receives beacons respectively transmitted by AP #1, AP #2, and AP #6 at predetermined beacon intervals. The second wireless device 122 is located in an area where the second wireless device 122 receives beacons respectively transmitted by AP #1 and AP #3 at predetermined beacon intervals. The third wireless device 124 is located in an area where the third wireless device 124 receives beacons respectively transmitted by AP #5 and AP #6 at predetermined beacon intervals. The fourth wireless device 126 is located in an area where the fourth wireless device 126 receives beacons respectively transmitted by AP #2, AP #4, and AP #6 at predetermined beacon intervals.

The first wireless device 120 attempts to connect to one of AP #1, AP #2, and AP #6 by selecting an AP based on the received beacons. The second wireless device 122 attempts to connect to one of AP #1 and AP #3 by selecting an AP based on the received beacons. The third wireless device 124 attempts to connect to one of AP #5 and AP #6 by selecting an AP based on the received beacons. The fourth wireless device 126 attempts to connect to one of AP #2, AP #4, and AP #6 by selecting an AP based on the received beacons.

The first through fourth wireless devices 120, 122, 124, and 126 use their received beacons when selecting an AP to which connection is to be attempted. In certain embodiments, the wireless device selects one AP to which connection is to be attempted, considering an interference condition predicted based on information acquired from the received beacon.

Generally, in a WLAN, sensing a physical collision for a wireless medium is difficult. In the WLAN, a radio resource is managed based on CA, rather than CD. In the WLAN, a CSMA/CA mechanism is applied to every frame to be transmitted, including a beacon.

However, a beacon is set to be transmitted first in the buffer because the beacon has to be broadcast periodically at predetermined time intervals. A normal data frame is transmitted in a First Come First Served (FCFS) manner. However, a beacon has the highest priority and is transmitted preferentially. As a result, an error of a time at which the beacon is received is expected to be very small. Herein, the error means a difference between an expected time the beacon is to arrive in the wireless device and an actual time at which the beacon arrives in the wireless device.

The error includes a propagation delay, a queue delay, and a waiting delay. The propagation delay occurs due to a distance between a wireless device and an AP. The queue delay occurs due to a frame which is already being transmitted, even when the beacon is positioned in the first part of the buffer due to the highest priority. The waiting delay occurs because a channel needs to be empty for a given back-off time.

Figure 8:
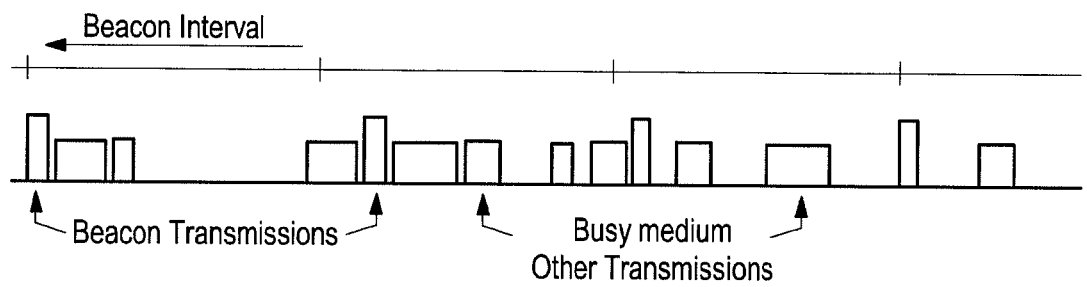
FIG. 8 illustrates an example of a time schedule for checking a delay in AP selection according to certain embodiments of the present disclosure.

Even when the three delays are summed, only an error of about 1 ms is generated, which is seen from a time schedule illustrated in FIG. 8.

It is difficult to predict, from the error value, whether an interference value of a wireless medium due to multiple transmitters is high or low. Instead of checking an interval error value from one beacon, interference of a wireless channel is sensed and monitored using an interval value between beacons continuously transmitted at predetermined intervals.

Every wireless device in the WLAN waits for an ACK frame responding to a data frame transmitted by the wireless device. Upon receiving the ACK frame, the wireless device concludes that the frame has been successfully transmitted to a destination and removes the frame from a temporary buffer. However, unlike the data frame, a beacon, because of being broadcast, may not be responded with an ACK frame. That is, the wireless device receives a beacon and merely uses information of the beacon, without transmitting an ACK with respect to the beacon to an AP.

When retransmission of a beacon is not determined based on whether or not an ACK is received, a beacon lost to collision is not retransmitted. In certain embodiments, by using such characteristics, the number of beacon collisions (or a beacon collusion number) or a probability of beacon collusion (or a beacon collision probability) in a beacon collection period is calculated and an interference level of a wireless channel is predicted based on the calculated value, thereby avoiding connection to a channel which frequently undergoes collision and thus increasing a wireless capacity of a wireless device.

Figure 7:
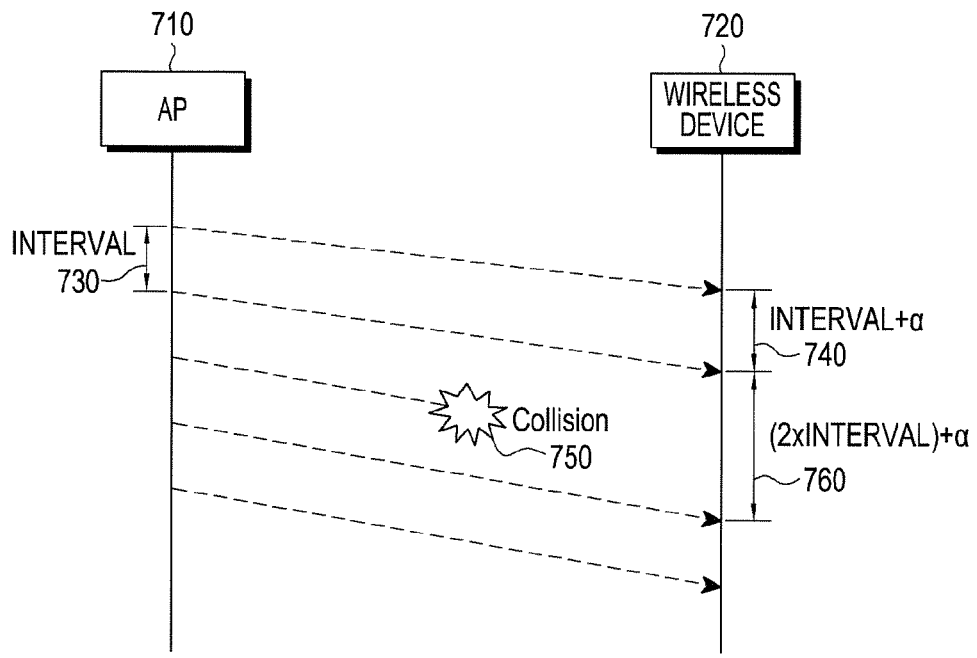
FIG. 7 illustrates one scenario requiring AP selection according to various embodiments of the present disclosure.

FIG. 7 illustrates one scenario requiring AP selection according to various embodiments of the present disclosure.

Referring to FIG. 7, an AP 710 transmits a beacon at predetermined beacon intervals 730, INTERVAL. A wireless device 720 receives the beacon transmitted by the AP 710 at predetermined intervals 740, INTERVAL+α. α, which determines the interval for receiving the beacon by the wireless device 720, is a parameter reflecting a channel condition. For example, α is a delay parameter defining an error between an expected time at which the wireless device 720 is expected to receive a second beacon after receiving a first beacon and an actual time at which the wireless device 720 actually receives the second beacon.

For the wireless device 720, receiving beacons transmitted at predetermined beacon intervals by the AP 710 at predetermined intervals 740, INTERVAL+α is ideal. However, due to collision 750 during transmission, or the like, the wireless device 720 fails to receive a beacon transmitted by the AP 710. In certain embodiments, the wireless device 720 receives the next beacon after an unexpected interval 760 (2×INTERVAL)+α, instead of after a predetermined interval 750 INTERVAL+α.

The wireless device 720 recognizes an interference condition caused by collision 750 or the like, and attempts connection to an optimal AP, considering the interference condition. Certain embodiments to be described are provided to select an AP that connection is to be attempted, considering the interference condition, thus providing a desirable AP connection.

According to the illustration of FIG. 7, when an interval of a beacon is given as INTERVAL, a wireless device, such as a receiver for receiving the beacon, continuously records an arrival time of the received beacon frame. When calculating a time difference between two consecutive beacon frames based on the recorded arrival time, the receiver recognizes a value corresponding to INTERVAL is added or subtracted. Such a value is acquired on the assumption that collusion 750 does not occur, and in a frequent-collision environment, addition or subtraction is made with respect to INTERVAL multiplied by a value c.

For example, in DCF of 802.11 MAC, a probability of collision increases as the number of communicating terminals increases, such that an actual beacon interval increases in light of a terminal.

In certain embodiments, information necessary for AP selection is defined as follows:

Beacon Interval Information is defined as information defining the intervals for an AP transmitting a beacon containing information of the AP. The beacon transmitted by the AP includes beacon interval information. By receiving the beacon, a wireless device easily reads the beacon interval information corresponding to the intervals at which the AP transmits the beacon.

Beacon Signal Strength Information is defined as information defining a signal strength measured with respect to the received beacon or probe response, when receiving a beacon or probe response sent by an AP via a reception (RX) antenna. The wireless device predicts interference by using the recognized beacon signal strength information.

Beacon Transmission Entity is defined as the accurate identity information of an AP that transmitted a beacon. For example, a wireless device identifies a beacon transmission entity based on predetermined information (BSSID, SSID, or the like) included in the received beacon.

Beacon Arrival Time is defined as information recording a time that a wireless device receives a beacon. The beacon arrival time is one of necessary elements for using an arrival time difference between a plurality of continuously received beacons.

In certain embodiments, a detailed description is made of a process that a wireless device predicts interference for connection with an AP and selects an AP to attempt connection with based on the predicted interference. A detailed description is made of a process for predicting interference based on beacons received from a plurality of APs and a process for selecting one AP to which connection is to be guided from among the plurality of APs.

In certain embodiments, various processes are presented for predicting interference for AP selection. For example, detailed embodiments are disclosed regarding interference prediction based on whether or not beacon collision occurs, interference prediction based on a metered value of a signal strength of a beacon, and interference prediction based on both whether or not beacon collision occurs and a metered value of a signal strength of a beacon.

Figure 2:
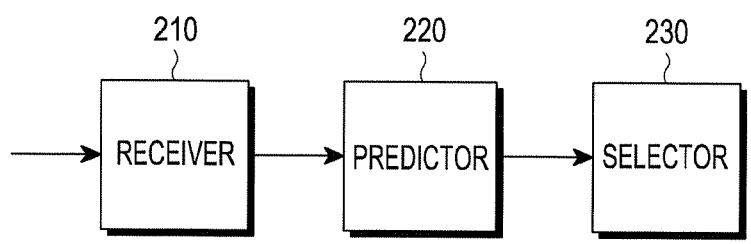
FIG. 2 illustrates a wireless device for selecting an AP to be connected, taking an interference condition into account, according to various embodiments of the present disclosure.

FIG. 2 illustrates a block diagram of a wireless device for selecting an AP to be connected, taking an interference condition into account according to various embodiments of the present disclosure.

Referring to FIG. 2, a receiver 210 receives a signal transmitted by one AP or a plurality of APs. The signal received by the receiver 210 is not limited to a particular type and can include various types and different corresponding formats. Moreover, information included in the signal differs according to the type of the signal. For example, the received signal includes a beacon or a beacon frame transmitted by one AP or each of the plurality of APs at predetermined beacon intervals.

A predictor 220 extracts a data frame that is decrypted by the predictor 220 from the signal received by the receiver 210. The predictor 220 analyzes a type of the extracted data frame and sorts a data frame, a type of which is a beacon frame, based on the analysis. The predictor 220 acquires information necessary for collision prediction and/or interference prediction from the data frame sorted as the beacon.

For example, the predictor 220 acquires information about a beacon interval and a transmission entity from the data frame sorted as the beacon, for collision prediction. In another example, the predictor 220 continuously measures a signal strength of the data frame sorted as a beacon and acquires a signal strength variance value based on the measured signal strength, for interference prediction.

The predictor 220 predicts a collision condition or an interference condition based on the acquired information, and outputs a result of the prediction.

For example, the predictor 220 acquires at least one of interval error information and a signal strength variance value by using a beacon and predicts collision and interference by using at least one of the acquired interval error information and signal strength variance value.

The predictor 220 predicts collision by using the interval error information or predicts interference by using the signal strength variance value.

Hereinafter, the collision condition and the interference condition are collectively referred to as a 'channel condition,' and the prediction of the collision condition and the interference condition are collectively referred to as 'channel state prediction.'

For example, when a collision is predicted using interval error information, the predictor 220 determines beacon interval information and beacon transmission entity information included in a beacon. The predictor 220 detects an interval error of a transmission entity based on the determined beacon interval information and beacon arrival time.

The predictor 220 predicts whether beacon collision occurs based on the detected interval error. Prediction of beacon collision based on the interval error is preferably applied when a wireless condition is predicted to be highly likely to have collision.

The interval error information is information indicating with how much error from the predicted arrival time of the beacon interval information a beacon has arrived. That is, the interval error information is determined by an error between the predicted arrival time of the beacon interval information and the actual arrival time at which the beacon actually arrives.

The predictor 220 compares a reference error that is set for determining whether collision occurs with the interval error of the beacon, and predicts whether collision occurs based on the comparison result. When the interval error of the beacon is higher than the reference error, the predictor 220 determines that collision occurs. The higher interval error of the beacon than the reference error sufficiently allows collision illustrated in FIG. 7 to be predicted. When the interval error of the beacon is determined to be higher than the reference error, it means that collision as illustrated in FIG. 7 is sufficiently predicted. A situation where the interval error is higher than the reference error corresponds to a situation where an actually generated interval (2×INTERVAL)+α is much larger than an expected interval INTERVAL+α.

The predictor 220 outputs the result of collision prediction based on the result of comparison between the reference error and the interval error of the beacon. The collision prediction result is information regarding a collision condition predicted for an AP that is a transmission entity. For example, the collision prediction result is a collision detection signal.

In another example, when interference is predicted using a signal strength variance value, the predictor 220 continuously extracts a signal strength of a beacon for each AP (or an AP-specific beacon signal strength) and calculates a signal strength metered value based on the extracted AP-specific beacon signal strength. The predictor 220 calculates the signal strength metered value for each AP (or an AP-specific signal strength metered value). The signal strength metered value is an example of the signal strength variance value.

The predictor 220 predicts an interference condition of each AP based on the AP-specific signal strength metered value. Prediction of interference using the signal strength variance value is preferably applied when a modulation scheme supporting a high data rate is not available although the wireless condition is not predicted to be highly likely to have collision.

The predictor 220 outputs a result of interference prediction using the signal strength variance value, that is, an interference prediction result that is information regarding an interference condition predicted for each AP. For example, the interference prediction result is an interference detection signal.

In another example, the predictor 220 predicts a collision condition and an interference condition, considering the interval error information and the signal strength variance value together. The predictor 220 predicts a collision value corresponding to each of the plurality of APs, by using the interval error information of the beacon. The predictor 220 selects the lowest collision value from among collision values respectively predicted for the plurality of APs. The lowest collision value means the lowest probability of collision. The predictor 220 sets a predetermined reference value and regards a lower collision value than the reference value as the lowest collision value.

When a plurality of APs that the lowest collision values are predicted, the predictor 220 predicts an interference value for each of the plurality of APs by using the acquired signal strength variance value. The predictor 220 selects the lowest interference value from among the interference values respectively predicted for the plurality of APs. The lowest interference value means the lowest probability of interference.

The predictor 220 outputs a channel state prediction result based on the collision prediction result using the interval error information of the beacon and based on the interference prediction result using the signal strength variance value. The channel state prediction result is information considering the interference condition predicted for each AP as well as the collision condition predicted for each AP. For example, the channel state prediction result is beacon entity information corresponding to a particular AP.

By predicting the collision condition and the interference collision, taking both the interval error information and the signal strength variance value into account, connection to an AP with the lowest probability of interference as well as the lowest probability of collision is attempted.

A selector 230 selects one AP to which connection is to be attempted from among a plurality of APs from which beacons are received, considering a prediction result provided by the predictor 220. For example, the prediction result is one of the collision prediction result, the interference prediction result, and the channel state prediction result predicted for each of the plurality of APs. In certain embodiments, the selector 230 selects one of the plurality of APs based on the collision prediction result or one of the plurality of APs based on the interference prediction result. The selected one AP is an AP having the lowest probability of collision or the lowest probability of interference.

The selector 230 selects an optimal AP from among the plurality of APs, taking both the probability of collision and the probability of interference into account based on the channel state prediction result.

A detailed scheme for selecting one AP, taking both the probability of collision and the probability of interference into account based on the channel state prediction result is the same as the above-described operation performed by the predictor 220. Thus, the detailed scheme for selecting one AP considering the probability of collision and the probability of interference together will not be described. To consider the probability of collision and the probability of interference together, the selector 230 is independently provided with the collision prediction result and the interference prediction result from the predictor 220.

The selector 230 finally selects an AP from which a beacon having the highest Received Signal Strength Indicator (RSSI) is received, from among the plurality of APs, when a plurality of APs have been selected considering the probability of collision or the probability of collision, or both of them.

Figure 3:
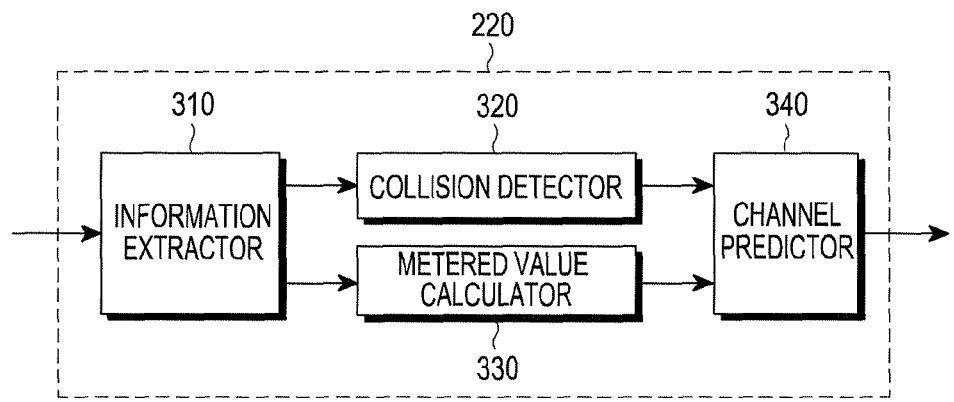
FIG. 3 illustrates a predictor for predicting a wireless channel condition by using a beacon received in a wireless device according to various embodiments of the present disclosure.

FIG. 3 illustrates a block diagram of the predictor 220 for predicting a wireless channel condition by using a beacon received in a wireless device according to certain embodiments of the present disclosure.

Referring to FIG. 3, an information extractor 310 extracts a beacon for predicting an interference condition for each of a plurality of APs from a signal received from each of the plurality of APs. For example, the information extractor 310 is configured with a physical information extraction unit and a beacon information extraction unit.

The physical information extraction unit extracts, from a received signal, a data frame the physical information extraction unit decrypts. The beacon information extraction unit analyzes a type of the data frame extracted by the physical information extraction unit. The beacon information extraction unit sorts the data frame extracted based on the analysis result, according to a type. The beacon information extraction unit extracts information for interference prediction from the data frame sorted as a beacon or continuously measures and outputs a signal strength of the data frame sorted as the beacon.

A collision detector 320 is provided from the information extractor 310 with beacon interval information and beacon transmission entity information. The collision detector 320 detects an interval error of a transmission entity, based on the beacon interval information and a beacon arrival time.

The collision detector 320 recognizes the transmission entity based on the beacon transmission entity information provided by the information extractor 310. The collision detector 320 determines whether beacon collision occurs based on the detected interval error. The collision detector 320 outputs a result of determination regarding collision or a collision detection signal. The collision detection signal means a collision value indicating whether collision occurs based on the beacon interval information.

A metered value calculator 330 is provided with a signal strength of the data frame sorted as a beacon, which is continuously measured by the information extractor 310. The metered value calculator 330 calculates an AP-specific signal strength metered value by applying various metered values, such as a variance or the like, to continuously provided signal strengths. For example, the signal strength metered value is a signal strength variance value. The metered value calculator 330 records the signal strength metered value calculated for each AP on a separate recording medium. The metered value calculator 330 outputs an interference detection signal corresponding to the signal strength metered value, a signal strength variance value, calculated for each AP. The interference detection signal means an interference value indicating a level of interference occurring based on beacon signal variance information.

In FIG. 3, the predictor 220 is illustrated as including both the collision detector 320 and the metered value calculator 330. However, a configuration of the predictor 220 varies according to which information is to be used for channel prediction. For example, when predicting whether or not collision occurs based on the beacon interval information, the predictor 220 needs to include only the collision detector 320. However, when predicting whether interference occurs based on the beacon signal variance information, the predictor 220 needs to include only the metered value calculator 330.

The predictor 220 includes both the collision detector 320 and the metered value calculator 330, and selectively considers collision or interference or both of them to predict a wireless channel condition.

The channel predictor 340 predicts an AP-specific wireless channel condition by using at least one of the collision value provided by the collision detector 320 and the interference value provided by the metered value calculator 330. Prediction of the wireless channel condition indicates prediction of the probability of collision, prediction of the probability of interference, or prediction of both the probability of collision and the probability of interference.

For example, the collision value is used for prediction of the probability of collision in an AP-specific transmission beacon, and the interference value is used for prediction of the probability of interference in the AP-specific transmission beacon.

When the predictor 220 does not include the channel predictor 340, a collision detection signal, collision value, output from the collision detector 320 and an interference detection signal, interference value, output from the metered value calculator 330 are provided directly to the selector 230. The selector 230 regards the collision detection signal, collision value, as a collision prediction result and the interference detection signal, interference value as an interference prediction result, to select one of the plurality of APs.

Figure 4:
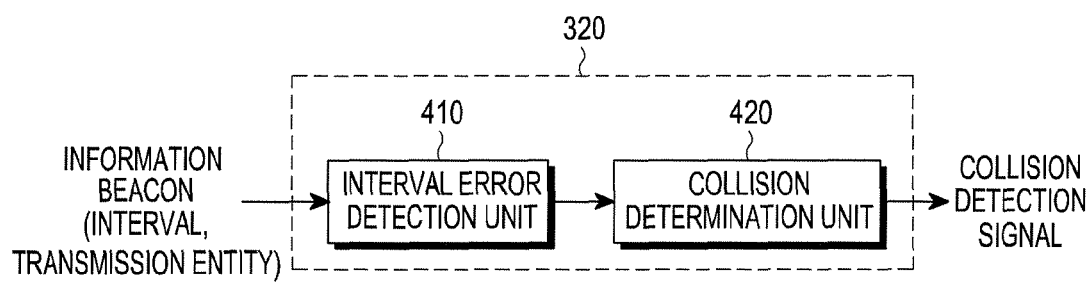
FIG. 4 illustrates a collision detector for detecting collision by using a beacon received in a wireless device according to various embodiments of the present disclosure.

FIG. 4 illustrates a block diagram of the collision detector 320 for detecting collision by using a beacon received in a wireless device according to various embodiments of the present disclosure.

Referring to FIG. 4, an interval error detection unit 410 detects an interval error of a transmission entity, based on input beacon information, such as the beacon interval information, the beacon transmission entity information, or the like, and a beacon arrival time. The interval error detection unit 410 recognizes an AP having transmitted a beacon based on the beacon transmission entity information.

For example, the interval error detection unit 410 detects an interval error corresponding to an AP from an error between a predicted arrival time based on the beacon interval information and an actual arrival time at which the beacon actually arrives.

A collision determination unit 420 determines whether collision occurs in a beacon transmitted from an AP, based on the interval error detected by the interval error detection unit 410. The collision determination unit 420 outputs a collision detection signal based on the determination result. The collision detection signal is a collision value indicating whether collision occurs based on the beacon interval information.

Figure 5:
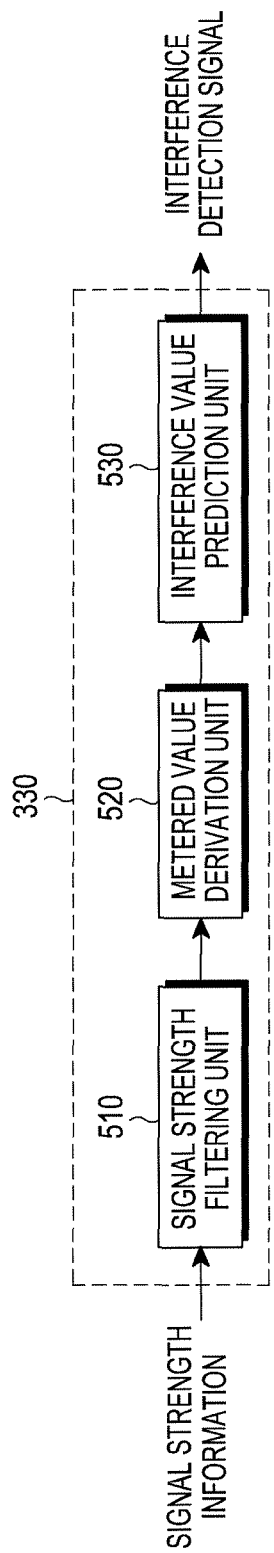
FIG. 5 illustrates a metered value calculator for detecting interference by using a beacon received in a wireless device according to various embodiments of the present disclosure.

FIG. 5 illustrates a block diagram of the metered value calculator 30 for detecting interference by using a beacon received in a wireless device according to various embodiments of the present disclosure.

Referring to FIG. 5, a signal strength filtering unit 510 measures and outputs a signal strength of each of continuously input beacons. A metered value derivation unit 520 calculates an AP-specific signal strength metered value by applying various metered values, such as a variance or the like, to the beacon signal strengths output from the signal strength filtering unit 510. For example, the signal strength metered value is a signal strength variance value. An interference value prediction unit 530 predicts, based on the AP-specific signal strength metered value (signal strength variance value) output by the metered value derivation unit 520, whether interference occurs in the corresponding AP, and outputs an interference detection signal based on the prediction result. The interference detection signal is an interference value indicating a level of interference with respect to a beacon transmitted from each AP.

Figure 6:
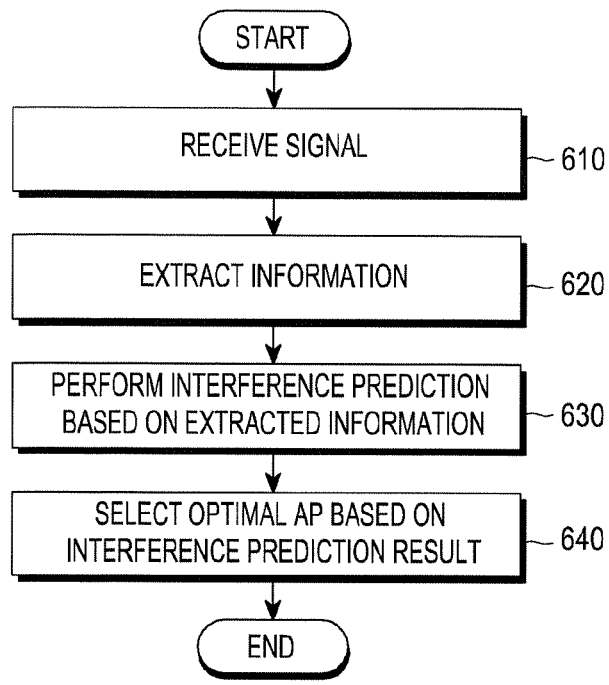
FIG. 6 illustrates and an exemplary process for a control flow for selecting an optimal AP to which connection is to be attempted in a wireless device according to various embodiments of the present disclosure.

FIG. 6 illustrates a flowchart illustrating a control flow for selecting an optimal AP to which connection is to be attempted in a wireless device according to various embodiments of the present disclosure.

In step 610, a wireless device receives a signal transmitted by each of a plurality of APs. The wireless device is assumed to be located in an area where the wireless device receives beacons transmitted by the plurality of APs.

In step 620, the wireless device extracts beacon information from a received signal. For example, the wireless device extracts, from the received signal, a data frame the wireless device decrypt, and analyzes a type of the extracted data frame. The wireless device sorts the data frame according to the analyzed type, and extracts beacon information (beacon interval information, beacon transmission entity information, and so forth) from a beacon frame acquired by the sorting.

Although not shown in the drawings, the wireless device acquires beacon signal strength information by continuously measuring a signal strength of an AP-specific beacon frame, thus to monitor occurrence of interference.

In step 630, the wireless device predicts a wireless channel condition by using at least one of the extracted beacon information and the beacon signal strength information. For example, the wireless device predicts a collision condition by using the extracted beacon information or predicts an interference condition by using the beacon signal strength information. The wireless device also predicts both the collision condition and the interference condition by using the extracted beacon information and the beacon signal strength information.

As to prediction of interference based on determination of whether beacon collision occurs, the wireless device determines whether collision occurs in a beacon frame transmitted by an AP, by using beacon interval information included in the beacon and actual beacon interval information that is acquired from two or more consecutive beacons. The wireless device predicts an interference value of an AP or of a channel used by the AP based on the determination of whether collision occurs. The wireless device determines a level of interference of each AP based on collected collision probability information, and recommends wireless communication to an AP having a low level of interference.

The wireless device acquires MAC frames acquired by scanning respective channels, and extracts beacon information from a beacon frame out of the MAC frame. Since the wireless device needs to receive beacon information of a particular AP continuously at least twice, it is desirable to implement the RX antenna to monitor each channel at least three times as long as a beacon interval.

Equation 1 defines a minimum time for which the RX antenna has to stay in each channel.

$$RT_{ch} = c \times \max(BI_x, x \in S_{AP_{ch}}) \qquad (1),$$

where $RT_{ch}$ represents a minimum time for which the RX antenna has to stay in a channel ch, $BI_x$ represents an interval of a beacon broadcast by an AP x, and $S_{AP_{ch}}$ represents a set of APs using the channel ch.

Continuous collision of a beacon of a particular AP hardly occurs, a constant c is measured as 3. However, when the number of wireless devices using an AP increases, continuous collision occurs, such that the constant c needs to dynamically change.

The wireless device checks a beacon frame from the MAC frame to extract beacon interval information and beacon transmission entity information included in the beacon frame. The wireless device arranges and continuously collects, based on the extracted information, beacon arrival time information and interval information for each AP in the form of a table.

If two or more beacon arrival time information have been collected for every neighboring AP, the wireless device sets a flag for detecting an interval error from information tables of all the APs. If a service or a user of the wireless device desires information of whether interference occurs as soon as possible, then upon flag setting, the information is immediately used for interval error detection. Otherwise, as much data as possible is collected to improve the accuracy of wireless channel state sensing, thus acquiring a high-reliability probability of collision.

The wireless device determines how much an actual interval increases or decreases with respect to beacon interval information included in a beacon based on an information table of each AP. As the number of beacons acquired from each AP increases, the number of interval errors also increases. The wireless device applies an interval error of each AP to $(BI_{actual} - BI_x)$ based on the collected interval errors, thus acquiring a result.

If the result is close to $\alpha$, the wireless device determines that there is no beacon frame lost due to collision. However, if the result is similar to or greater than $(BI_x + \alpha)$, the wireless device predicts that one or more collisions occur. Based on such comparison and analysis, the wireless device calculates the number of beacon collisions occurring during a particular time.

Equation 2 defines an example for calculating a collision probability.

$$P_{collision} = \frac{N_{collision}}{EN_{beacon}}, \qquad (2)$$

where $N_{collision}$ represents the number of colliding beacons and $EN_{beacon}$ represents an expected value of the number of beacons to be received from an AP. The expected value is simply acquired using a beacon interval and a total time used for scanning each channel.

The wireless device predicts an interference level of an AP based on the collision probability acquired using Equation 2. The wireless device predicts, from a large number of collisions, that a large number of terminals attempt transmission in an AP or a channel used by the AP. The wireless device also determines an interference condition of an AP based on the collision probability.

For example, as the number of collisions increases, the wireless device predicts that the number of terminals attempting transmission in an AP or a channel used by the AP increases. In such a wireless channel that collision frequently occurs, it is difficult to expect high network efficiency. Thus, the wireless device had better not connect to an AP using that channel. The wireless device had better attempt connection to an AP having a low collision probability and a proper signal strength proportional to a distance, which is a good measure of guiding connection to an AP having the freest wireless traffic.

Figure 9:
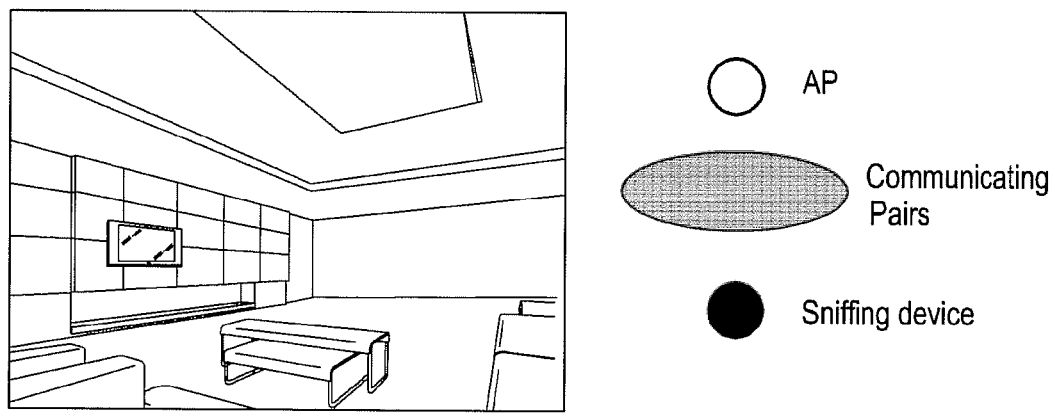
FIG. 9 illustrates an experiment environment for verifying validity of a scheme proposed according to various embodiments of the present disclosure.

FIG. 9 illustrates an environment for verifying validity of a process according to various embodiment of the present disclosure.

Illustrated in FIG. 9, are one AP, ten smart phones, and four laptop computers, among which fourteen devices perform WI-FI transmission (such as iperf) through the AP. A beacon collision rate and a collision (such as an interference) rate of communication traffic is made through an AP. In certain embodiments, as the distribution of the signal strength increases, interference occurs more fervently, such that a total amount of traffic communicated in the AP gradually decreases.

The accuracy of the proposed embodiment is high when a relationship between a beacon collision rate and a collision rate of communication traffic is made through an AP is clear. One laptop computer, except for the above-defined fifteen devices, has an Airpcap mounted therein to collect all wireless communication from the AP, and a set of a client and a server communicating through WI-FI transmission (iperf) was defined as a pair. Each pair performs User Datagram Protocol (UDP) communication of 30 Mbps.

Figure 10:
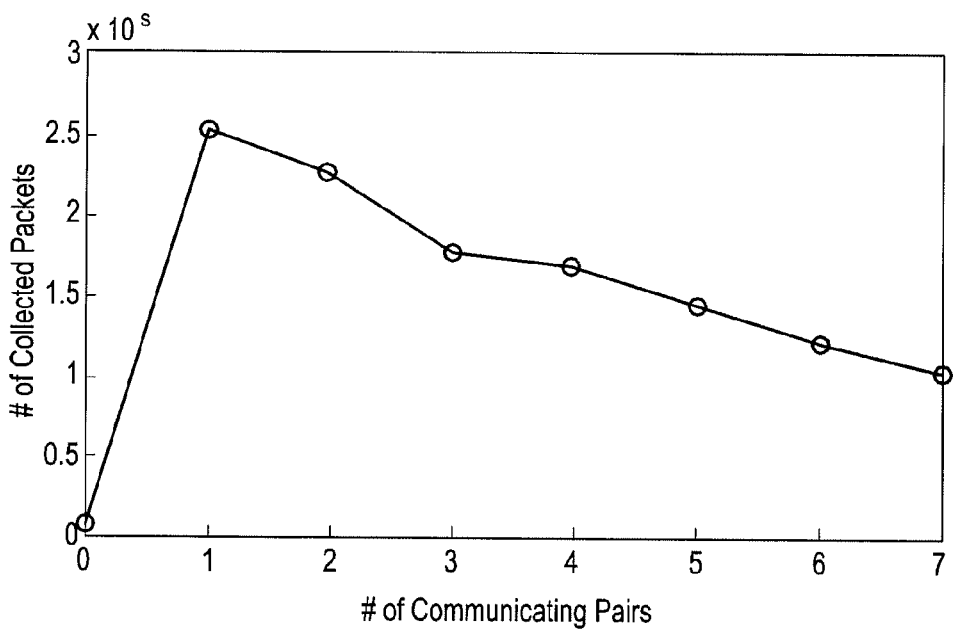
FIG. 10 illustrates a graph showing an experiment result according to various embodiments of the present disclosure.

FIG. 10 illustrates a graph showing a result according to certain embodiments of the present disclosure.

Referring to the result shown in FIG. 10, as the number of communicating pairs increases, the network quality decreases. Moreover, as the number of communicating pairs increases, the number of collected beacons decreases similarity with the number of collected AP total communication frames. Those two decrease tendencies are very similar to each other, and for the other data than pair 0, a relationship between the number of collected beacons and the number of collected frames are expressed as a correlation coefficient. In certain embodiments, the correlation coefficient has a high value of 0.89.

As the correlation coefficient is close to 0, two parameters have a low relationship; as the correlation coefficient is close to 1, they have a high relationship. The relationship in the illustrated result corresponds to a correlation coefficient being close to 1.

Meanwhile, as to prediction of interference using a signal strength metered value of a beacon, the beacon, like other data frames, is transmitted based on a back-off time, with CSMA/CA applied thereto. However, for the beacon, the concept of retransmission does not exist, such that the size of a contention window for setting the back-off time is inevitably limited. Moreover, as the number of transceivers using a channel increases, a probability of simultaneous transmission by two or more wireless devices on the same wireless channel also increases.

Thus, as transmitters close to each other attempt signal transmission at the same time or a plurality of transmitters transmit a signal to one receiver at the same time, interference can occur. When interference occurs, collision usually occurs or a signal strength measured in the frame reception is amplified.

When the wireless devices are located so close to each other as to have collision occurred, they may not read a beacon. However, when the wireless devices are located with enough distance between them to have a Signal to Interference-plus-Noise Ratio (SINR) established to allow reading of a beacon, an RSSI increases more than usual.

In certain embodiments, by determining an interference level of an AP or a channel based on signal characteristics, the wireless quality of a target AP to be connected is predicted.

To this end, the wireless device senses and decrypts a signal received from outside via an RX antenna. Generally, a threshold value of an SINR for determining whether frame transmission is successful varies according to a modulation scheme used for signal transmission. When the SINR of the received signal is greater than the threshold, it determines that the received signal is decryptable as a frame. The wireless device acquires the decrypted frame and acquires signal strength information corresponding to reception of each frame.

Equation 3 defines a signal strength.

$$RSSI = S + I + N \quad (3),$$

where RSSI represents a signal strength when a frame is received, S represents a signal strength from an entity having transmitted the frame, I represents a total signal strength acquired from other communication devices or interferers, which transmit signals at the same time as the frame transmission, than the frame transmission entity, and N represents a noise of a wireless channel being used.

A numerator of a formula for calculating an SINR is not RSSI, but S, and a denominator of the formula is (I+N). Herein, RSSI represents an actual power measured by the RX antenna when a particular frame is received.

The wireless device determines whether the frame is a beacon frame based on the frame and the measured signal strength information. The wireless device accumulates the beacon frame extracted from the frame and the signal strength corresponding to the beacon frame in its buffer. The wireless device recognizes identify information of a transmission AP from a header portion of the extracted beacon frame to continuously extract a signal strength of a beacon corresponding to each AP.

When a user or a terminal needs information for intelligently determining an interference level of neighboring APs, the wireless device extracts a metered value based on signal strength accumulation information for all the managed APs. The metered value is a metered value of signal strengths of several beacons received from each AP. Herein, the metered value refers to a value calculated using a particular formula based on the provided signal strength accumulation information. For example, the wireless device calculates a total of three types of metered values according to a condition of the wireless device.

The wireless device arranges a wireless network quality order of neighboring APs by using metered values such as average, variance, and interference value excess rate of a signal strength. Such information is useful for connection to a WLAN or handover.

Prediction of an interference value using the above-defined metered value will be described in detail below.

(1) Average of Signal Strength

When a strength of a received signal is measured when there is no interference, a crowded condition of an AP is estimated based on a difference between an average strength of a signal received for a particular time and a strength of a signal corresponding to absence of interference, by using Equation 4.

$$S_{AP} = RSSI - I - N$$

$$AVG_{RSSI} > S_{AP} + N \quad (4),$$

where $AVG_{RSSI}$ represents an average signal strength of RSSIs collected so far, and $S_{AP}$ represents a strength of a signal received from an AP having transmitted a beacon signal.

The strength of the received signal is a value resulting from filtering an interference signal strength and channel noise from a strength of a signal received at that time, as described before.

When the wireless device separately extracts a signal strength of its received frame, a crowded condition of an AP having transmitted a beacon is estimated using Equation 4. When it is difficult to extract the value N, noise is assumed to be 0, because a large $AVG_{RSSI}$ value implies a large number of transmitters.

Figure 11:
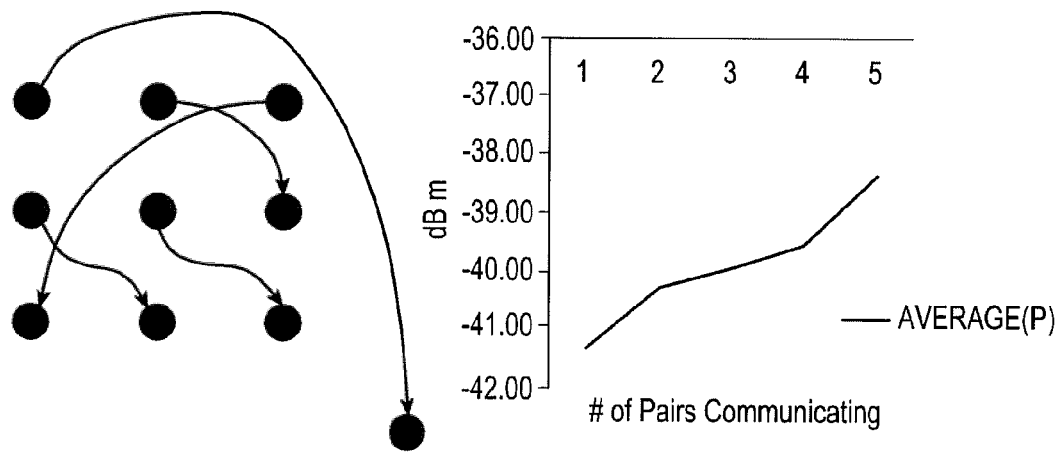
FIG. 11 illustrates experiment environment and result for demonstrating facts according to various embodiments of the present disclosure.

FIG. 11 illustrates an environment and result for demonstrating facts according to various embodiments of the present disclosure.

An experiment in an environment illustrated in FIG. 11 was carried out through ns2. Five nodes transmitted Constant Bit Rate (CBR) traffic of 500 bytes to the other five nodes once at predetermined intervals, and to reflect network reality, CBR traffic generation intervals of all the transmitters were set slightly different.

It can be seen from the right graph of FIG. 11 that as the number of wireless device increases one by one, an average signal strength dBm increases. The signal strength was extracted from a reception node of Pair 1, which started transmission and reception first, and the dBm value when an x axis of the graph is 1 is $S_{AP}$ of Equation 4. Based on the value $S_{AP}$, as the number of transceivers increases, an average signal strength $AVG_{RSSI}$ also increases. In addition, the number of transmitters, that is, an interference level of an AP or a channel is proportional to the average signal strength.

(2) Variance of Signal Strength

An average signal strength according to the foregoing description is largely proportional to an interference level of a channel. However, the wireless device may not be able to extract a signal strength from which interference and noise values are removed. In certain embodiments, an interference value represented by $AVG_{RSSI}$ is difficult to predict because existing $S_{AP}$ is not known, such that another metered value is needed.

In certain embodiments, a scheme for monitoring a crowded condition using a variance of a signal strength, that is, using a variance.

Equation 5 is an example showing a proportional relationship between a variance of a signal strength and an interference value of an AP.

$$T_{density} \propto \text{Var}(S_{signal} | \text{RSSI}_t \in S_{signal}) \quad (5),$$

where $T_{density}$ represents crowdedness of a current AP estimating an interference value of the AP, $S_{signal}$ represents a set of signal strengths collected so far, and $\text{RSSI}_t$ represents a total signal strength including all of noise and interference values and a beacon signal strength which are measured at time t.

Var( ) represents a change corresponding to the square of a standard deviation of values in parentheses, and is one of ways to express a probability distribution function of a signal strength. In certain embodiments, a probability distribution function of signal strengths collected for each AP is expressed as a change to easily illustrate the experiment result.

Based on Equation 5, a proportional relationship between a wireless quality of an AP or a channel and a probability distribution of a beacon is identified.

Figure 12:
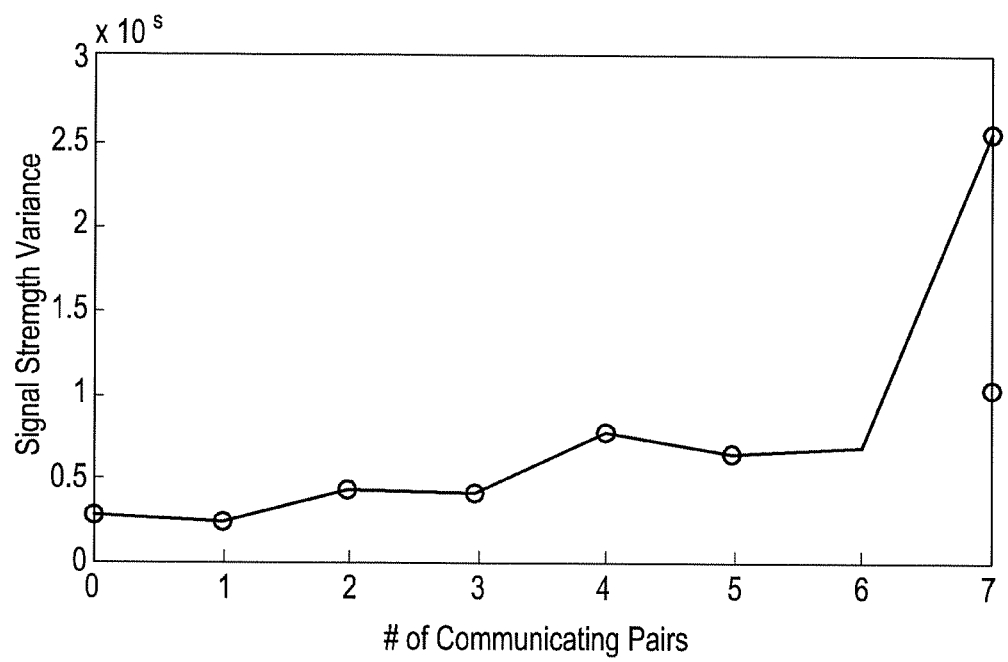
FIG. 12 illustrate graphs showing an experiment result in which interference occurs more frequently as a variance of a signal strength increases, and thus a total amount of traffic communicated in an AP gradually decreases according to various embodiments of the present disclosure.

FIG. 12 illustrate graphs showing an example in which interference occurs more frequently as a variance of a signal strength increases, and thus a total amount of traffic communicated in an AP gradually decreases.

In the example shown in FIG. 12, as the number of communicating pairs increases, a total saturated throughput decreases. When a correlation coefficient of a set of two parameters is 0.7, it means that relation between two parameters (a signal strength distribution and an interference value/traffic amount) is very clear.

(3) Interference Value Excess Rate

Another way to estimate a crowded level of an AP by using a signal strength of a beacon is calculating a rate of excesses over a threshold value of an interference value by using Equation 6 and Equation 7.

$$T_{density} \propto P_{excess}, \quad (6)$$

$$P_{excess} = \frac{N(RSSI_t | RSSI_t > \alpha, t \leq t_{cur})}{N(RSSI_t | t \leq t_{cur})}, \quad (7)$$

where N(.) represents the number of pairs in parentheses, and $P_{excess}$ represents a probability or rate of excesses over an interference value, and this rate means a rate of excesses of a signal strength over a limited value $\alpha$ among signal strengths collected so far.

A way to acquire a differs according to whether a beacon received-signal strength is extracted from a total signal strength in a wireless device.

For a wireless device capable of accurately extracting a received-signal strength of a beacon, a is set to a result of adding an error value β to the recently extracted beacon signal strength or a result of adding the error value β to an average value of beacon signal strengths extracted so far. However, in an environment where a signal strength is difficult to extract, the lowest value among RSSI values extracted so far or an average value of the lowest θ RSSI values be defined as a.

Figure 13:
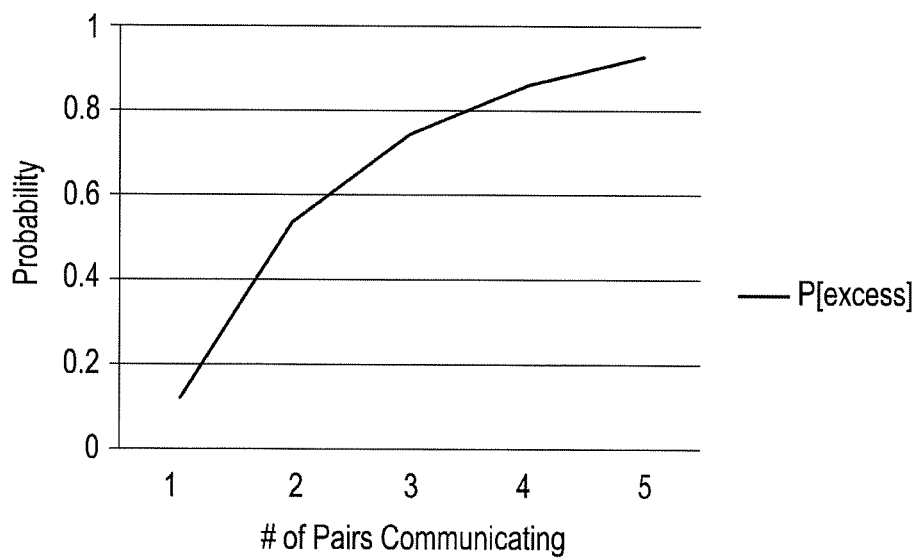
FIG. 13 illustrates a graph showing an experiment result in which a proportional relationship between a ratio and an interference value of an AP can be seen according to various embodiments of the present disclosure.

FIG. 13 illustrates a graph showing an example result in which a proportional relationship between a ratio and an interference value of an AP can be seen according to various embodiments proposed in the present disclosure. The example environment for acquiring an example result in FIG. 14 is the same as illustration in FIG. 11.

α is defined to acquire the experiment result shown in FIG. 13 indicates the lowest value among recorded signal strengths, and the other environment factors are identical to those in previous experiments. According to the example result in FIG. 13, as the number of transceivers increases, a rate of signal strengths exceeding an interference value increases.

Any metered value based on statistics of RSSI values of received frames in addition to the aforementioned metered value is used to predict a crowded condition of an AP or a channel in the present disclosure. Based on these metered values, an AP interference value predictor analogizes a wireless quality of an AP according to a level of a signal strength metered value of every AP, and information desired by most terminal users is information about an AP capable of providing the best wireless performance among neighboring APs, such that an AP having the optimized metered value is selected and provided to the user terminal. That is, for a signal average, an AP having $AVG_{rssi}$ being closest to (S+N) is recommended. For a signal distribution, an AP having the smallest change is recommended. For a limitation release rate, an AP having the lowest $P_{excess}$ is recommended.

As to selection of an optimal AP based on interference prediction, various parameters used for interference prediction and utilization of the parameters are described. In certain embodiments, a scheme for selecting an optimal AP is provided.

For example, in case of interference prediction using beacon collision, an AP with the lowest collision rate among calculated collision rates is selected; in the case of interference prediction using signal distribution, an AP with the lowest variance value is selected to use communication having the lowest interference value causing distribution.

As mentioned previously, in a proposed embodiment, two interference schemes are used together or one of them is used depending on a wireless link condition. Besides, one more point needs to be considered. That is, a connection delay time is an issue because when a user prefers prompt use of a wireless service over a quality of the wireless service, interference prediction requires scanning at least once. Thus, when scanning is performed at least once, user's satisfaction is likely to degrade. Detailed connection schemes considering such a user's tendency are as provided below.

First, for a user giving the highest priority to a delay time, connection based on interference prediction proposed above is avoided and connection to an AP having the highest signal strength is performed. When the use of a wireless network by the user is infrequent, scanning is delayed sometimes to collect various information necessary for interference prediction up to a predetermined amount of information, such that connection to an optimal AP is performed using the collected information. Also in certain embodiments, it needs to be determined whether the user is currently using the wireless network.

Second, for a user giving the highest priority to a data rate, the user is patient for a predetermined level of a delay time.

In certain embodiments, the amount of information collected is maximized (based on a user's endurable delay time) to improve the accuracy of interference prediction, such that connection to an AP having the minimum interference value is performed.

Third, for a user continuing quality measurement with respect to a connected AP, the quality of a user desired level may not be provided in a particular time zone because the amount of wireless data managed by the AP changes from time to time. To prepare for this case, scanning is performed when an available wireless capacity provided by an AP is larger than a consumption amount of a terminal, so as to accumulate information, and when a level of user's satisfaction with the wireless quality is reduced below a predetermined level, a handover to another AP is performed. Herein, the handover means a change of an AP and includes a mobile Internet Protocol (IP) or tunneling technique for smooth communication.

In various embodiments of the present disclosure, an interval of a beacon signal sent from neighboring APs is used, and a surrounding environment around a user's terminal is sensed without changing an internal design or system operations of the neighboring APs, such that the present disclosure is practical and cost-efficient when compared to the aforementioned other techniques.

Other effects that are acquired or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for connecting to an access point (AP) in a wireless device, the method comprising:
   acquiring interval error information by a beacon received from at least one AP;
   predicting an interference condition from each of a plurality of APs based on the interval error information acquired by the beacon;
   selecting one of the plurality of APs, taking the predicted interference condition into account; and
   attempting connection to the selected AP.

2. The method of claim 1, further comprising:
   extracting a decryptable data frame from a signal received from each of the plurality of APs; and
   sorting the beacon from the extracted decryptable data frame by analyzing a type of the extracted data frame.

3. The method of claim 2, wherein predicting the interference condition comprises:
   identifying interval information and a transmission entity included in the sorted beacon;
   detecting an interval error of the identified transmission entity based on the identified interval information and an arrival time of the sorted beacon;
   determining a collision of the sorted beacon based on the detected interval error; and
   predicting an interference condition of an AP corresponding to the identified transmission entity, based on a result of determining the collision.

4. The method of claim 1, wherein acquiring the interval error information comprises acquiring a signal strength variance value by the beacon.

5. The method of claim 4, wherein predicting the interference condition comprises predicting an interference condition by using the signal strength variance value.

6. The method of claim 5, wherein when a high collision probability is not expected for a wireless condition and a modulation scheme supporting a high data rate is not available, the interference condition is predicted using the signal strength variance value.

7. The method of claim 4, wherein selecting one of the plurality of APs comprises:
   selecting at least one AP with a lowest interference value indicating the interference condition predicted using the interval error information, from among the plurality of APs; and
   when a plurality of APs are selected, selecting one AP with a lowest interference value indicating the interference condition predicted using the signal strength variance value, from among the plurality of selected APs.

8. The method of claim 1, wherein when a high collision probability is expected for a wireless condition, the interference condition is predicted using the interval error information.

9. The method of claim 1, wherein predicting the interference condition comprises:
   continuously extracting a signal strength of the beacon, acquired corresponding to each of the plurality of APs;
   calculating a signal strength metered value based on the signal strength of the beacon, extracted for each of the plurality of APs; and
   predicting an interference condition of each of the plurality of APs based on the calculated signal strength metered value.

10. The method of claim 1, wherein selecting one of the plurality of APs comprises:
    selecting one AP with an interference value predicted to be lowest from among interference values indicating interference conditions predicted respectively for the plurality of APs.

11. A wireless device connecting to an access point (AP), the wireless device comprising:
    a receiver processing circuitry configured to receive a signal from each of a plurality of APs;
    a predictor processing circuitry configured to:
       acquire interval error information by a beacon received from at least one AP;
       predict an interference condition based on the interval error information acquired using the beacon; and
    a selector processing circuitry configured to select one AP to which connection is to be attempted from among the plurality of APs, taking the predicted interference condition into account.

12. The wireless device of claim 11, wherein the predictor processing circuitry is further configured to:
    extract a decryptable data frame from a signal received from each of the plurality of APs; and
    sort the beacon from the extracted decryptable data frame by analyzing a type of the extracted data frame.

13. The wireless device of claim 11, wherein the predictor processing circuitry is further configured to acquire a signal strength variance value by the beacon.

14. The wireless device of claim 13, wherein when a wireless condition is expected to have a high collision probability, the predictor processing circuitry is further configured to predict the interference condition using the interval error information.

15. The wireless device of claim 12, wherein the predictor processing circuitry is further configured to:
   identify interval information and a transmission entity included in the sorted beacon;
   detect an interval error of the identified transmission entity based on the identified interval information and an arrival time of the sorted beacon;
   determine a collision of the sorted beacon based on the detected interval error; and
   predict an interference condition of an AP corresponding to the identified transmission entity based on a result of determining the collision.

16. The wireless device of claim 11, wherein the predictor processing circuitry is further configured to:
   continuously extract a signal strength of the beacon, acquired corresponding to each of the plurality of APs;
   calculate a signal strength metered value based on the signal strength of the beacon, extracted for each of the plurality of APs; and
   predict an interference condition of each of the plurality of APs based on the calculated signal strength metered value.

17. The wireless device of claim 13, wherein the selector processing circuitry is further configured to select at least one AP having a lowest interference value indicating the interference condition predicted using the interval error information, from among the plurality of APs and when a plurality of APs are selected, selects one AP having another lowest interference value indicating the interference condition predicted using the signal strength variance value, from among the plurality of selected APs.

18. The wireless device of claim 13, wherein the predictor processing circuitry is further configured to predict an interference condition by using the signal strength variance value.

19. The wireless device of claim 18, wherein when a wireless condition is not expected to have a high collision probability and a modulation scheme supporting a high data rate is not available, the predictor processing circuitry is further configured to predict the interference condition using the signal strength variance value.

20. The wireless device of claim 11, wherein the selector processing circuitry is further configured to select one AP having an interference value predicted to be lowest from among interference values indicating interference conditions predicted respectively for the plurality of APs.

* * * * *